(12) United States Patent
Hong et al.

(10) Patent No.: US 8,378,027 B2
(45) Date of Patent: Feb. 19, 2013

(54) MANUFACTURING METHOD OF POLYLACTIC ACID COMPOSITE COMPOSITION

(75) Inventors: Chae Hwan Hong, Gyeonggi-do (KR); Do Suck Han, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 126 days.

(21) Appl. No.: 13/155,544

(22) Filed: Jun. 8, 2011

(65) Prior Publication Data
US 2012/0245292 A1 Sep. 27, 2012

(30) Foreign Application Priority Data

Mar. 25, 2011 (KR) ................ 10-2011-0027121

(51) Int. Cl.
*C08L 67/04* (2006.01)
*B29C 45/00* (2006.01)
*C08F 216/14* (2006.01)
(52) U.S. Cl. ............... 525/190; 525/450; 264/328.17
(58) Field of Classification Search .......... 525/190, 525/450; 264/328.17
See application file for complete search history.

(56) References Cited

U.S. PATENT DOCUMENTS

| 7,354,973 | B2 * | 4/2008 | Flexman | 525/162 |
| 2010/0112357 | A1 * | 5/2010 | Fine et al. | 428/413 |

FOREIGN PATENT DOCUMENTS

| JP | 2008063356 A | 3/2008 |
| KR | 10-2009-0024709 | 3/2009 |
| KR | 10-2010-0027438 | 3/2010 |
| KR | 10-2010-0055335 | 5/2010 |
| KR | 10-2010-0079986 | 7/2010 |
| KR | 10-2011-0008248 | 1/2011 |

\* cited by examiner

*Primary Examiner* — Fred M Teskin
(74) *Attorney, Agent, or Firm* — Edwards Wildman Palmer LLP; Peter F. Corless

(57) ABSTRACT

Disclosed is a method for manufacturing a polylactic acid composite composition, and a polylactic acid composite composition formed thereby. More particularly, there is disclosed a method for manufacturing a polylactic acid composite composition including: melting and blending a composition containing 60-80 wt % of a poly(L-lactic acid) resin, 15-30 wt % of a poly(D-lactic acid) resin and 5-10 wt % of a poly(ethylene-alkyl acrylate-glycidyl methacrylate) resin at 190-195° C.; and injecting the resulting melt in a mold whose surface temperature is 100-110° C. The present invention provides a material having superior heat resistance, impact strength and tensile strength by blending the PLLA resin, the PDLA resin and the poly(ethylene-alkyl acrylate-glycidyl methacrylate) resin at specific proportion, under controlled processing and molding conditions. The polylactic acid composite composition prepared according to the present invention can replace the petroleum-based general-use polymer resins and engineering plastic materials that have been used for automobile parts with the environment-friendly biomass-based biomaterials, and may be usefully utilized for automobile interior and exterior parts.

9 Claims, No Drawings

MANUFACTURING METHOD OF POLYLACTIC ACID COMPOSITE COMPOSITION

CROSS-REFERENCE TO RELATED APPLICATIONS

This application claims priority under 35 U.S.C. §119 to Korean Patent Application No. 10-2011-0027121, filed on Mar. 25, 2011, in the Korean Intellectual Property Office, the disclosure of which is incorporated herein by reference in its entirety.

BACKGROUND (a) Technical Field

The present invention relates to a method for manufacturing a polylactic acid composite composition having superior heat resistance and impact resistance.

(b) Background Art

It is difficult to think about the modern civilization without fossil fuel resources, particularly petroleum, as an energy source. However, petroleum is an unrenewable fossil fuel whose reserve will soon be depleted. The recent rapid industrial development along with population growth has led to the drastic increase in petroleum consumption. As a result, there have been growing concerns of global warming due to greenhouse gas emissions as well as environmental pollution due to waste production.

Polymers derived from plants, i.e., biomass polymers, are prepared through chemical or biological processes from renewable plant resources such as corn, bean, sugar cane, wood, etc. Their value lies in reducing the environmental problem through carbon dioxide reduction rather than in biodegradability. Of the biomass polymers, polylactic acid (or polylactide, hereinafter also referred to as PLA) is a carbon neutral, environment-friendly, thermoplastic, linear aliphatic polyester. It is derived from corn starch or potato starch through fermentation or it can be prepared by polymerizing sugar monomers obtained from saccharification of plant-derived cellulose followed by fermentation.

First synthesized in 1940s, PLA was initially utilized solely for sutures and drug delivery systems because of its high manufacturing cost. In 1997, Cargill and Dow Chemical of the United States jointly established a venture company named Cargill Dow Polymer (renamed as NatureWorks in December 2007). In 2002, the company opened a PLA production facility capable of producing 140,000 tons of PLA annually, and produces various PLA products including film, cups, food containers, packaging materials, etc. in large scale. The company also continues to perform researches.

Despite the increase in availability of PLA, industrial application of PLA material is restricted because it possesses inferior physical properties when compared to other general-use polymer materials. In particular, in order for the material to be suitable for use in automobile parts, improvement of heat resistance and impact resistance is essential.

Korean Patent Application Publication Nos. 2010-0027438 and 2011-0008248 and Japanese Patent Application Publication No. 2008-063356 propose materials with improved heat resistance obtained by blending the optical isomers of polylactic acid. And, Korean Patent Application Publication Nos. 2010-0079986 and 2009-0024709 propose polylactic acid compositions exhibiting improved impact resistance by adding an ethylene-alkyl acrylate-glycidyl methacrylate copolymer to polylactic acid. However, the physical properties of these materials are still unsatisfactory in heat resistance and impact resistance for use in automobile parts.

SUMMARY

The present invention provides polylactic acid materials having improved heat resistance. In particular, it has been discovered that the blending of optical isomers of polylactic acid results in a change in crystal growth and the subsequent formation of stereocomplex crystals, thereby significantly improving heat resistance. Further, it has been found that, by controlling the temperature of melting and blending within a specific range to improve the stability of the stereocomplex crystal structure, and by injection molding the melt in a mold having a surface temperature of a specific range, the strength as well as the heat resistance can be improved due to improved crystallinity. It has further been found that, by blending the resulting polylactic acid resin composition with a poly(ethylene-alkyl acrylate-glycidyl methacrylate) resin, polylactic acid composite compositions having excellent heat resistance and impact resistance can be prepared.

The present invention is directed to a method for providing a polylactic acid material having superior heat resistance and impact resistance, especially one having significantly improved properties as compared to the currently known blend of optical isomers of polylactic acid. The present invention, thus, reduces manufacturing cost and remarkably improves the mechanical properties of the polylactic acid material.

In one general aspect, the present invention provides a method for manufacturing a polylactic acid composite composition including: melting and blending a composition including 60-80 wt % of a poly(L-lactic acid) resin ("PLLA"), 15-30 wt % of a poly(D-lactic acid) resin ("PDLA") and 5-10 wt % of a poly(ethylene-alkyl acrylate-glycidyl methacrylate) resin at 190-195° C.; and injecting the resulting melt into a mold whose surface temperature is 100-110° C.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

DETAILED DESCRIPTION

Hereinafter, reference will now be made in detail to various embodiments of the present invention, examples of which are described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a method for manufacturing a polylactic acid composite composition comprising: melting and blending a composition comprising a poly(L-lactic acid) resin, a poly(D-lactic acid) resin and a poly(ethylene-alkyl acrylate-glycidyl methacrylate) resin at a specific predetermined temperature; and injecting the resulting melt in a mold having a surface temperature of a specific predetermined range.

In accordance with aspects of the invention, when the poly(L-lactic acid) (PLLA) resin is contacted with the poly(D-lactic acid) (PDLA) resin, stereocomplex crystals are formed. The parallel polymer chain packing and the strong van der Waals attraction between $CH_3$ and $O=C$ in the thus formed crystal lattices of the two optically isomeric materials result in improved crystallinity and a denser crystal structure. As a result, improved thermal properties are obtained.

In typical processes, the surface temperature of the injection mold is usually about 40° C. However, it has been found that under this condition, the polylactic acid resin may remain uncrystallized due to the low crystallization speed. The resulting low crystallinity makes it difficult to attain further improvement in physical properties. However, in accordance with the present invention, when the surface temperature of the mold is maintained at about 100-110° C., the polylactic acid chain becomes more flexible, making it easier to form a lamellar structure and, thus, providing improved crystallinity. When the surface temperature of the mold is outside the above range, i.e., outside the range which has been found to optimize crystallization, the heat resistance of the final product may be degraded.

It has further been found that, by maintaining the temperature at 190-195° C. while the above components are melted and blended, the stereocomplex crystals which are formed are maintained and, as a result, the content of the stereocomplex crystals is increased.

According with various embodiments, the PLLA may be synthesized from biomass such as starch, and may have a melt index (MI) of about 10-40 g/10 minutes (at 190° C. and 2.16 kg load). When the melt index is lower than 10 g/10 minutes, processing overload may occur due to increased melt viscosity. When melt viscosity exceeds 40 g/10 minutes, extrusion molding or injection melding may become difficult. The PLLA resin may be contained in a suitable amount, and is preferably contained in an amount of about 60-80 wt % based on total weight of the composition (i.e., total weight of PLLA, PDLA and poly(ethylene-alkyl acrylate-glycidyl methacrylate) resins). When the content is less than 60 wt %, the amount of the PDLA resin is increased relatively, thereby increasing cost. When the PLLA content exceeds 80 wt %, it may become more difficult to attain improved heat resistance because an unstable stereostructure is typically formed.

The PDLA may also be synthesized from biomass such as starch, and may have an MI of about 30-70 g/10 minutes (at 190° C. and 2.16 kg load). When the melt index is lower than 30 g/10 minutes, processing may be problematic due to increased melt viscosity. When the melt index exceeds 70 g/10 minutes, extrusion molding or injection molding may become difficult.

The PDLA resin may be contained in a suitable amount, and it is preferably contained in an amount of about 15-30 wt % based on total weight of the composition. When the content is less than 15 wt %, it may become more difficult to attain improved heat resistance because an unstable stereostructure is typically formed. When PDLA content exceeds 30 wt %, costs increase because the amount of the expensive PDLA resin is increased relatively.

The poly(ethylene-alkyl acrylate-glycidyl methacrylate) resin is an ethylene copolymer comprising a suitable combination of ethylene, alkyl acrylate and of glycidyl methacrylate, and may preferably comprise about 75-85 wt % of ethylene, about 8-15 wt % of alkyl acrylate and about 3-10 wt % of glycidyl methacrylate. When the contents of the alkyl acrylate and the glycidyl methacrylate are outside the aforesaid ranges, a change in adhesion at a contact area of the interface between the matrix resin, i.e., the polylactic acid, and the dispersion phase may result in deteriorated impact resistance. In accordance with one preferred embodiment, the resin may comprise 85 wt % of ethylene, 10 wt % of alkyl acrylate and 5 wt % of glycidyl methacrylate. According to various embodiments, the alkyl acrylate may be one or more selected from methyl acrylate, ethyl acrylate, n-butyl acrylate, isobutyl acrylate, n-octyl acrylate and 2-ethylhexyl acrylate. In accordance with one preferred embodiment, the alkyl acrylate may be n-butyl acrylate. The poly(ethylene-alkyl acrylate-glycidyl methacrylate) resin provides an increase in impact strength. According to embodiments of the present invention, the poly(ethylene-alkyl acrylate-glycidyl methacrylate) resin may have a melt index of about 2-10 g/10 minutes (at 190° C. and 2.16 kg load). When the melt index is below 2 g/10 minutes, it may be difficult to uniformly disperse the composite material. When melt index exceeds 10 g/10 minutes, the resulting tensile properties may be unsatisfactory. The poly(ethylene-alkyl acrylate-glycidyl methacrylate) resin may be contained in a suitable amount, and preferably is contained in amount of about 5-10 wt % based on the total weight of the composition. When the content of the resin is less than 5 wt %, application to automobile parts may be difficult since the impact strength is degraded remarkably. when the content of the resin exceeds 10 wt %, application for industrial purposes may become greatly restricted due to resulting unsatisfactory tensile properties.

The polylactic acid composite composition of the present invention may, in some embodiments, further comprise various other additional components conventionally used, such as, for example, a heat stabilizer, an antioxidant, a photostabilizer, or the like, if necessary or desired. In some embodiments, the polylactic acid composite composition may further comprise an organic or inorganic pigment, a dye, etc.

According to various embodiments of the present invention, when the PLLA resin, the PDLA resin and the poly (ethylene-alkyl acrylate-glycidyl methacrylate) resin are melted and blended, the temperature is maintained at 190-195° C. By specifying the temperature of melting and blending as described above, the once-formed stereocomplex crystals are maintained and, thus, the heat resistance of the polylactic acid composite is enhanced. When the temperature of melting and blending exceeds 195° C., the stereocomplex crystals may be partly melted. The decrease in the content of the stereocomplex crystals resulting therefrom is unfavorable in terms of heat resistance improvement. When the temperature of melting and blending is below 190° C., blending overload may occur.

According to embodiments of the present invention, the resulting melt is injection molded in a mold whose surface temperature is 100-110° C. Through this operation, the crystallinity of the injection molded polylactic acid composite composition is improved and, as a result, the heat resistance and the tensile strength are further enhanced. The injection molding is performed by rapidly heating the surface of the mold to the crystallization temperature of the polylactic acid resin, i.e., 100° C., through any suitable means (e.g. electrical heating and the like), injecting the melt, allowing it to reside for 1-3 minutes, and then cooling to normal temperature. At this time, the surface temperature of the injection mold is preferably maintained above the crystallization temperature of the polylactic acid resin, i.e., 100° C. Since there is little practical benefit in effect even when the temperature exceeds 110° C., the surface temperature of the injection mold may be maintained at 100-110° C. to avoid waste of energy. Furthermore, when the surface temperature of the injection mold is outside the aforesaid range, the crystallization behavior of the resin may be negatively affected, resulting in a deterioration in heat resistance and mechanical properties.

In accordance with various embodiments, the present methods provide polylactic acid composite compositions having a combination of superior tensile strength, impact strength and heat resistance. For example, according to the present invention, polylactic acid composite compositions can be prepared which possess a tensile strength of at least 70 MPa, an impact strength of at least 6 kgf cm/cm, and a heat resistance of at least 100° C. It has been found that tensile strengths below 70 MPa or higher can result in a deterioration in the mechanical property of the composition. Further, if the impact strength is below 6 kgf cm/cm, the mechanical property of the composition can deteriorate. Also, a heat resistance below 100° C. can result in a deterioration in the mechanical strength and dimensional stability of the composition.

The polylactic acid composite composition prepared according to the present invention forms stereocomplex crystals as the PLLA resin is blended with the PDLA resin. The change in crystal structure can be confirmed through X-ray diffraction analysis, and the change in crystallinity can be confirmed through differential scanning calorimetry. The polylactic acid composite resin composition with a high degree of stereoregularity has remarkably improved heat resistance and mechanical properties, particularly impact resistance. Thus, it makes an environment-friendly material capable of coping with global regulation of carbon dioxide emission in various industries, especially for use in forming automobile parts.

EXAMPLES

The examples and experiments will now be described. The following examples and experiments are for illustrative purposes only and not intended to limit the scope of this invention.

A poly(L-lactic acid) (PLLA) resin, a poly(D-lactic acid) (PDLA) resin and a poly(ethylene-n-butyl acrylate-glycidyl methacrylate) resin were stirred and mixed in dry state, and melted and blended using a mixer. As a result, the PDLA resin and the poly(ethylene-n-butyl acrylate-glycidyl methacrylate) resin were dispersed into the poly(L-lactic acid) resin. Then, the resulting melt was injection molded, maintained for about 1-3 minutes, and cooled to normal temperature to prepare a polylactic acid composite composition. For Examples 1 and 2 and Comparative Examples 3 and 5, the surface of the injection mold was rapidly heated within 15 seconds through electrical heating. The contents of the constituents, the temperature of melting and blending, and the surface temperature of the injection mold are given in Table 1.

TABLE 1

|  | Example | | Comparative Example | | | | |
| --- | --- | --- | --- | --- | --- | --- | --- |
|  | 1 | 2 | 1 | 2 | 3 | 4 | 5 |
| PLLA (wt %) | 80 | 70 | 100 | 80 | 80 | 70 | 70 |
| PDLA (wt %) | 15 | 20 | 0 | 15 | 15 | 20 | 20 |

TABLE 1-continued

|  | Example | | Comparative Example | | | | |
| --- | --- | --- | --- | --- | --- | --- | --- |
|  | 1 | 2 | 1 | 2 | 3 | 4 | 5 |
| Ethylene copolymer (wt %) | 5 | 10 | 0 | 5 | 5 | 10 | 10 |
| Temperature of melting and blending (° C.) | 190 | 195 | 220 | 190 | 220 | 190 | 220 |
| Surface temperature of injection mold (° C.) | 100 | 100 | 110 | 40 | 110 | 40 | 110 |

PLLA: poly(L-lactic acid) resin (Ingeo 3251D; NatureWorks, USA)
PDLA: poly(D-lactic acid) resin (Purac, The Netherlands) Ethylene copolymer: poly(ethylene-n-butyl acrylate-glycidyl methacrylate) copolymer resin (Elvaloy; DuPont, USA)

Test of Physical Properties

For measurement of mechanical properties of the composite compositions prepared in Examples 1-2 and Comparative Examples 1-5, test specimens were prepared by injection molding according to the test methods described below (ASTM D 638, ASTM D 256 and ASTM D 648). Then, physical properties were measured according to the test methods. The result is given in Table 2. The test specimen for tensile property measurement was dumbbell-shaped, and the test specimen for impact strength measurement was notched.

Tensile Strength

The test specimen was prepared according to ASTM D 638 (Standard Test Method for Tensile Properties of Plastics) and tensile strength was measured using a universal testing machine (tensile strength [Pa]=maximum load [N]/initial cross-sectional area of specimen [m$^2$]).

Impact Strength

The test specimen was prepared according to ASTM D 256 (Standard Test Methods for Determining the Izod Pendulum Impact Resistance of Plastics) and impact strength was measured using an Izod impact tester.

Heat Resistance

The test specimen was prepared according to ASTM D 648 (Standard Test Method for Deflection Temperature of Plastics under Flexural Load in the Edgewise Position) and heat resistance was measured using a universal testing machine.

TABLE 2

|  | Mechanical properties | | |
| --- | --- | --- | --- |
|  | Tensile strength (MPa) | Impact strength (kgf cm/cm) | Heat resistance (° C.) |
| Ex. 1 | 76 | 6.9 | 119 |
| Ex. 2 | 77 | 7.0 | 120 |
| Comp. Ex. 1 | 67 | 2.8 | 57 |
| Comp. Ex. 2 | 66 | 3.8 | 56 |
| Comp. Ex. 3 | 65 | 3.9 | 55 |
| Comp. Ex. 4 | 66 | 3.8 | 57 |
| Comp. Ex. 5 | 67 | 3.7 | 56 |

As seen from Table 2, in Examples 1-2, wherein the PLLA resin, the PDLA resin and the poly(ethylene-n-butyl acrylate-glycidyl methacrylate) resin were mixed at the specific proportions of the present invention, melted and blended with the temperature controlled within the temperature range of the present invention, and injection molded with the temperature of the mold controlled in accordance with the present invention, the materials exhibited significantly improved tensile strength, impact strength and heat resistance as compared to Comparative Example 1 wherein only the PLLA resin was used. Comparative Examples 2 and 4, wherein the surface temperature of the injection mold was maintained at 40° C., showed less significant improvement in heat resistance as compared to Examples 1-2. This distinction in heat resistance is because, in Examples 1-2, the temperature of the injection mold was controlled within the range of the invention which resulted in accelerated crystallization of the composite material and, thus, improved crystallinity. Comparative Examples 3 and 5, wherein the temperature of melting and blending were maintained at 220° C., failed to give improved heat resistance because the stereocomplex crystals decreased due to melting. Furthermore, the impact strength test result reveals that Comparative Examples 2-5 show better physical property than Comparative Example 1 due to the addition of the poly(ethylene-n-butyl acrylate-glycidyl methacrylate) resin. But, the physical properties of Comparative Examples 2-5 are very low as compared to Examples 1-2 since the temperature of melting and blending and the temperature of the injection mold were not controlled within the specific range in accordance with the present invention. This shows that the control of the temperature of melting and blending to maintain the content of the stereocomplex crystals and the control of the temperature of the injection mold to improve crystallinity are advantageous not only in heat resistance but also in improvement of impact strength. For tensile strength, although it was expected that Comparative Examples 3 and 5, wherein the surface temperature of the injection mold was controlled, would show better property than Comparatives Example 2 and 4, no significant difference was observed in Comparative Examples 2-5. This may be due to the reduction of the stereocomplex crystals in Comparative Examples 3 and 5, wherein the melting and blending were performed at high temperature.

The present invention provides a material having superior heat resistance, impact strength and tensile strength by blending the PLLA resin, the PDLA resin and the poly(ethylene-alkyl acrylate-glycidyl methacrylate) resin at specific proportions, under controlled processing and molding conditions. The polylactic acid composite composition prepared according to the present invention is made up of environment-friendly biomass-based biomaterials, and can replace the petroleum-based general-use polymer resins and engineering plastic materials that have been used for automobile parts, and may further be usefully utilized for automobile interior and exterior parts.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. A method for manufacturing a polylactic acid composite composition comprising:
   melting and blending a composition comprising 60-80 wt % of a poly(L-lactic acid) resin, 15-30 wt % of a poly(D-lactic acid) resin and 5-10 wt % of a poly(ethylene-alkyl acrylate-glycidyl methacrylate) resin at 190-195° C., wherein wt % are based on total weight of the composition; and
   injecting the composition in a mold whose surface temperature is 100-110° C.

2. The method for manufacturing a polylactic acid composite composition according to claim 1, wherein the poly(L-lactic acid) resin has a melt index (MI) of 10-40 g/10 minutes measured at 190° C. and 2.16 kg load.

3. The method for manufacturing a polylactic acid composite composition according to claim 1, wherein the poly(D-lactic acid) resin has a melt index (MI) of 30-70 g/10 minutes measured at 190° C. and 2.16 kg load.

4. The method for manufacturing a polylactic acid composite composition according to claim 1, wherein the alkyl acrylate of the poly(ethylene-alkyl acrylate-glycidyl methacrylate) resin is one or more selected from methyl acrylate, ethyl acrylate, n-butyl acrylate, isobutyl acrylate, n-octyl acrylate and 2-ethylhexyl acrylate.

5. The method for manufacturing a polylactic acid composite composition according to claim 1, wherein the poly(ethylene-alkyl acrylate-glycidyl methacrylate) resin comprises 75-85 wt % of ethylene, 8-15 wt % of alkyl acrylate and 3-10 wt % of glycidyl methacrylate.

6. A polylactic acid composite composition prepared by the method according to claim 1.

7. An automobile part comprising the polylactic acid composite composition according to claim 6.

8. A polylactic acid composite composition comprising a combination of a poly(L-lactic acid) resin, a poly(D-lactic acid) resin and a poly(ethylene-alkyl acrylate-glycidyl methacrylate) resin, wherein the composition has a tensile strength greater than 70 MPa, an impact strength greater than 6 kgf cm/cm, and a heat resistance greater than 100° C.

9. The polylactic acid composite composition of claim 8 comprising 60-80 wt % of a poly(L-lactic acid) resin, 15-30 wt % of a poly(D-lactic acid) resin and 5-10 wt % of a poly(ethylene-alkyl acrylate-glycidyl methacrylate) resin, wherein wt % are based on total weight of the composition.

* * * * *